US012732460B1

(12) United States Patent
Katti et al.

(10) Patent No.: US 12,732,460 B1
(45) Date of Patent: Sep. 8, 2026

(54) OFFLOADING FRAGMENTED TRAFFIC WITHOUT BUFFERING

(71) Applicant: Juniper Networks, Inc., Sunnyvale, CA (US)

(72) Inventors: Anand Siddappa Katti, Bangalore (IN); AnandaVelu Thulasiram, San Jose, CA (US); Bhupesh Bhargava, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 314 days.

(21) Appl. No.: 18/394,100

(22) Filed: Dec. 22, 2023

(51) Int. Cl.

| | |
|---|---|
| ***H04W 4/00*** | (2018.01) |
| ***G06F 16/901*** | (2019.01) |
| ***H04L 45/7453*** | (2022.01) |

(52) U.S. Cl.
CPC ...... *H04L 45/7453* (2013.01); *G06F 16/9014* (2019.01)

(58) Field of Classification Search
CPC .... H04L 45/7453; H04L 67/148; H04L 45/38
See application file for complete search history.

(56) References Cited

U.S. PATENT DOCUMENTS

| | | | | |
|---|---|---|---|---|
| 7,724,776 | B2 | 5/2010 | Julien et al. | |
| 8,644,339 | B1 * | 2/2014 | Krishna | H04W 28/065 370/474 |
| 2008/0235260 | A1 * | 9/2008 | Han | G06F 40/143 707/999.102 |
| 2009/0129394 | A1 * | 5/2009 | Bar-Kovetz | H04L 49/90 370/395.32 |
| 2010/0284404 | A1 * | 11/2010 | Gopinath | G06F 9/5005 370/392 |
| 2020/0014763 | A1 * | 1/2020 | Boon | H04L 67/14 |
| 2020/0059485 | A1 * | 2/2020 | Ergin | H04L 47/2441 |
| 2021/0119925 | A1 * | 4/2021 | Modi | H04L 12/1877 |
| 2021/0314303 | A1 * | 10/2021 | Kittur | G06F 13/28 |
| 2022/0147502 | A1 * | 5/2022 | Chu | G06F 16/2255 |
| 2022/0166709 | A1 * | 5/2022 | Barman | H04L 45/38 |

FOREIGN PATENT DOCUMENTS

| | | |
|---|---|---|
| EP | 3570524 B1 | 3/2021 |

* cited by examiner

*Primary Examiner* — Abdelnabi O Musa
(74) *Attorney, Agent, or Firm* — Harrity & Harrity, LLP

(57) ABSTRACT

A network device may receive traffic that includes fragments of a packet, and may store the fragments in a hash table, based on tuple hashes of the fragments, until a first fragment of the packet is received by a network processing unit (NPU) of the network device. The NPU of the network device may determine a service offloaded (SOF) session associated with the packet based on tuples included in the first fragment, and may provide the fragments from the hash table toward a destination based on the SOF session. The network device may store an SOF session identifier in the hash table.

20 Claims, 12 Drawing Sheets

Figure 1B:
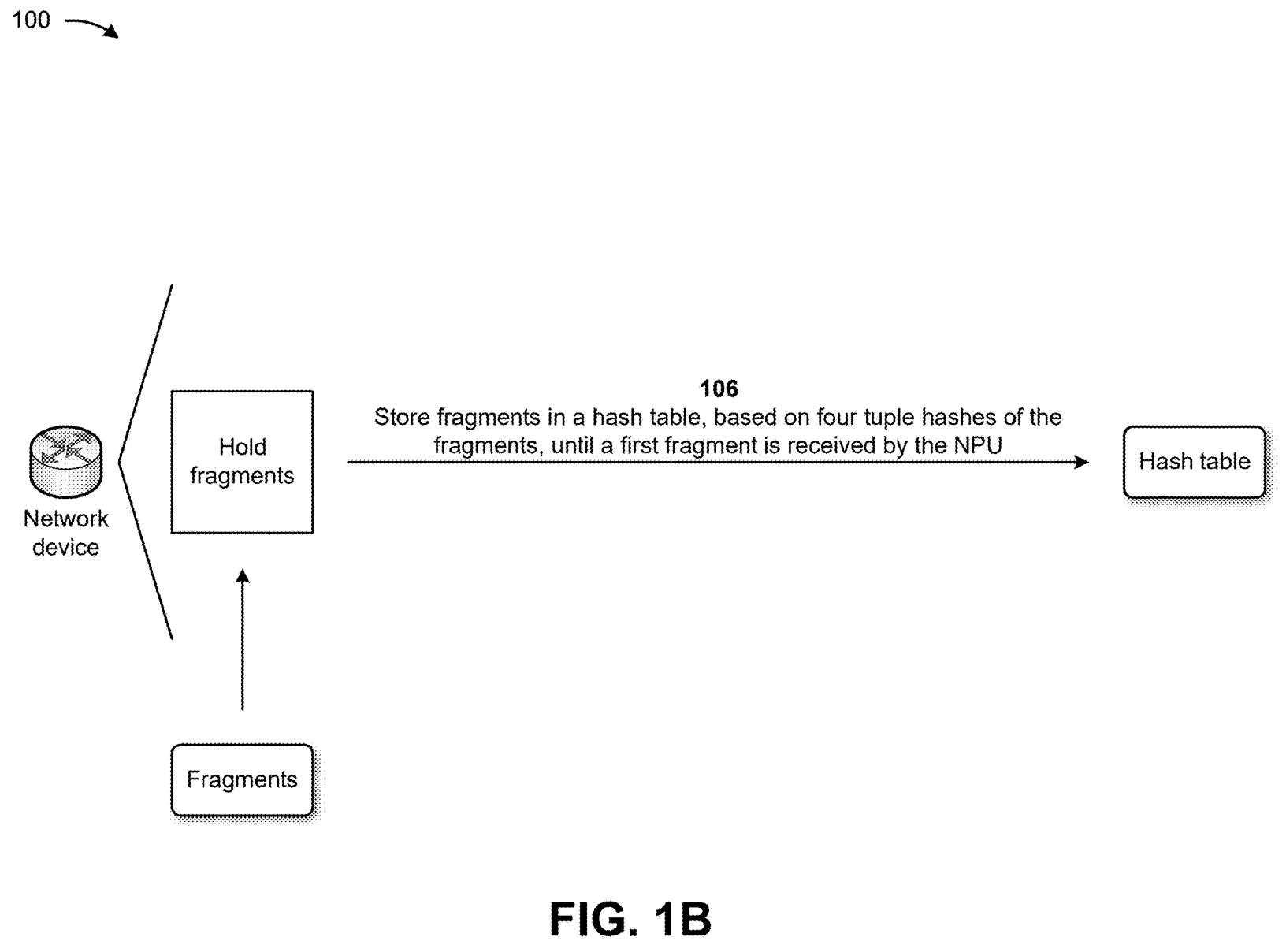

100

Network device

Hold fragments

Fragments

106
Store fragments in a hash table, based on four tuple hashes of the fragments, until a first fragment is received by the NPU Hash table

OFFLOADING FRAGMENTED TRAFFIC WITHOUT BUFFERING

BACKGROUND

In distributed networking, traffic is segregated into control plane and data plane to support an increasing demand for finer control and scaling requirements.

SUMMARY

Some implementations described herein relate to a method. The method may include receiving traffic that includes fragments of a packet, and storing the fragments in a hash table, based on tuple hashes of the fragments, until a first fragment of the packet is received by a network processing unit (NPU) of the network device. The method may include determining, by the NPU, a service offloaded (SOF) session associated with the packet based on tuples included in the first fragment, and providing the fragments from the hash table toward a destination based on the SOF session. The method may include storing an SOF session identifier in the hash table.

Some implementations described herein relate to a network device. The network device may include one or more memories and one or more processors. The one or more processors may be configured to receive traffic that includes fragments of a packet, and store the fragments in a hash table, based on tuple hashes of the fragments, until a first fragment of the packet is received by an NPU of the network device. The one or more processors may be configured to determine an SOF session associated with the packet based on tuples included in the first fragment, and provide the fragments from the hash table toward a destination based on the SOF session. The one or more processors may be configured to store an SOF session identifier in the hash table.

Some implementations described herein relate to a non-transitory computer-readable medium that stores a set of instructions. The set of instructions, when executed by one or more processors of a network device, may cause the network device to receive traffic that includes fragments of a packet, and store the fragments in a hash table, based on tuple hashes of the fragments, until a first fragment of the packet is received by an NPU of the network device. The set of instructions, when executed by one or more processors of the network device, may cause the network device to determine an SOF session associated with the packet based on tuples included in the first fragment, and provide the fragments from the hash table toward a destination based on the SOF session. The set of instructions, when executed by one or more processors of the network device, may cause the network device to store an SOF session identifier in the hash table.

BRIEF DESCRIPTION OF THE DRAWINGS

FIGS. 1A-1H are diagrams of an example associated with offloading fragmented traffic without buffering.

DETAILED DESCRIPTION

Figure 1A:
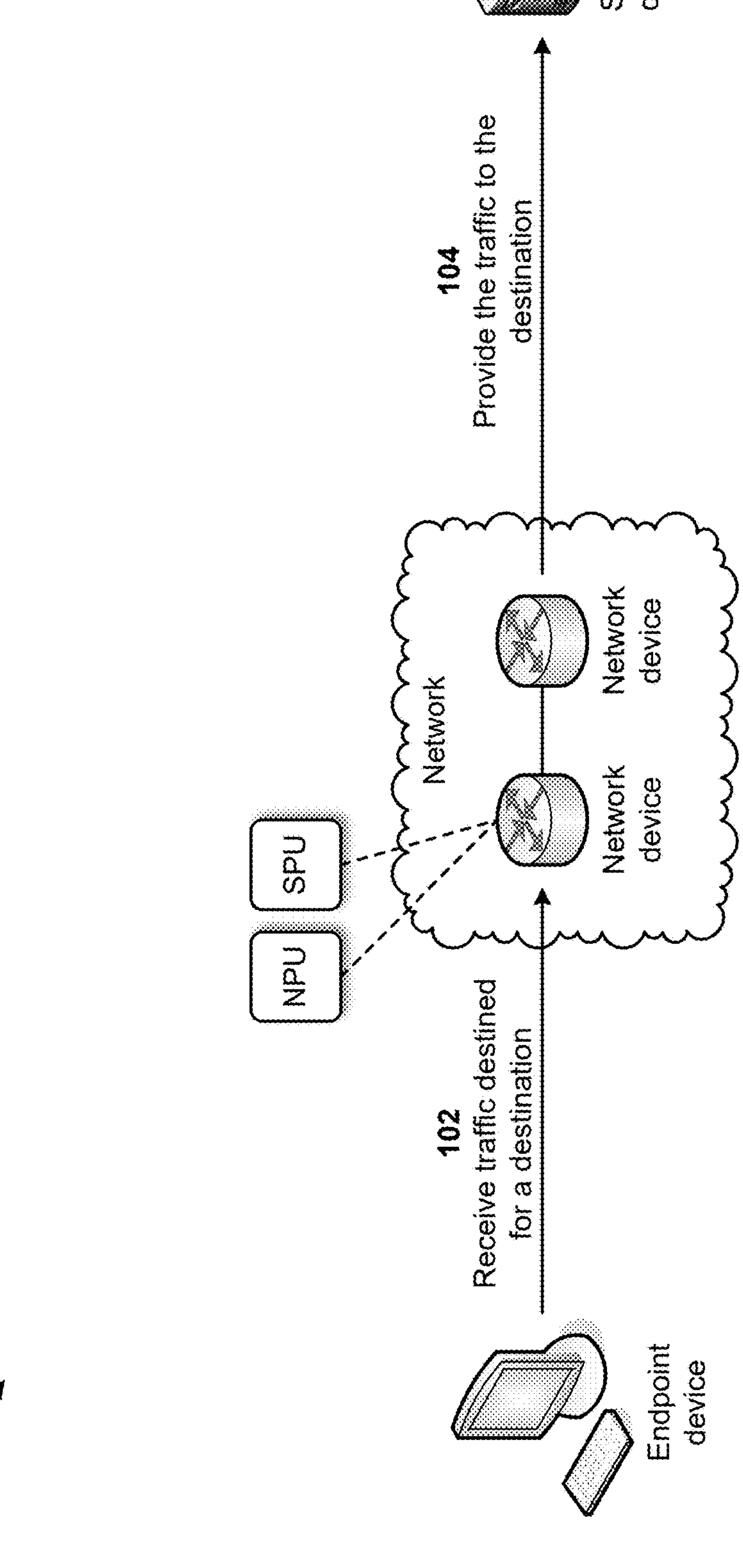

The following detailed description of example implementations refers to the accompanying drawings. The same reference numbers in different drawings may identify the same or similar elements.

A network device employs dedicated processors to efficiently process different categories of traffic (e.g., control plane traffic and data plane traffic). A data plane traffic processing path may be referred to as a hardware fast path. Some network devices may utilize services offloading for processing fast-path packets in a network processor unit (NPU) of the network device instead of in a services processing unit (SPU) of the network device. This may reduce packet-processing latency that arises when packets are forwarded from NPUs to SPUs for processing and back to input/output components (IOCs) for transmission. A service offloaded (SOF) session may be uniquely identified by tuples (e.g., five tuples, such as a source Internet protocol (IP) address, a destination IP address, a protocol, a source port, and a destination port) of a packet. A first packet of a session may always be processed by the SPU. Based on certain criteria, the SPU decides whether a session is suitable for offloading or not, and accordingly the SPU installs the SOF session on the NPU.

A network device may receive mixed traffic in which frames belonging to a session can be fragmented or full-sized frames. The network device may forward a first packet of each session to the SPU to allow the SPU to process and install SOF flows on the NPU. The NPU may extract the five tuples from an ingress packet to form a hash key, may check for a matching SOF session, and may either offload or forward the packet to the SPU. However, if the packet is fragmented, the NPU cannot obtain the five tuples and the SOF session cannot be determined. Thus, the NPU provides all packet fragments to the SPU, which stores, reassembles, and loopbacks the reassembled packet to the NPU to run through the SOF session again. As the processing does not occur on the hardware fast path, such a process generates significant delay.

For example, if the network device receives a packet stream for an existing SOF session, the packet stream may include a fragmented packet (e.g., P1) with three fragments (e.g., f1P1, f2P1, and f3P1) and a non-fragmented packet (e.g., P2). All packets may be received in order since packet P2 is received after the fragments of packet P1. Ideally these packets should be transmitted by the network device in the same order as received, but may be delivered out of order. Since packet P1 is a fragmented packet, the network device may forward the packet fragments (e.g., f1P1, f2P1, and f3P1) to the SPU. While the SPU is de-fragmenting and reassembling the P1 fragments, the NPU may receive the non-fragmented packet P2, may match packet P2 with an existing SOF session, and may offload packet P2 before offloading the P1 fragments. This will result in an out of order delivery of the received packet stream.

A current solution for handling the above is to delete the SOF session as soon as a fragmented packet is received so that later arriving packets do not find a matching SOF session. However, nearly 30 to 40% of system traffic is fragmented, and deleting the SOF session drastically decreases network device throughput. Adding and deleting an SOF session may generate a lot of SPU cycles and utilizations if the SOF session includes fragmented and non-fragmented packets. Furthermore, storing fragments of a packet before processing the fragments may consume a lot of memory of the network device. Since the packet fragments are reassembled in the SPU, overall network device throughput is affected and the NPU is underutilized. Multiple hops of the packet fragments in the SPU may create additional delay in reassembly of the packet fragments.

Thus, current techniques for handling fragmented traffic consume computing resources (e.g., processing resources, memory resources, communication resources, and/or the like), networking resources, and/or the like, associated with drastically decreasing network device throughput, generating a lot of SPU cycles and utilizations, utilizing memory for storing fragments of a packet, underutilizing the NPU of the network device, creating additional delay in reassembly of the packet fragments, and/or the like.

Some implementations described herein relate to a network device that offloads fragmented traffic without buffering. For example, a network device may receive traffic that includes fragments of a packet, and may store the fragments in a hash table, based on tuple hashes of the fragments, until a first fragment of the packet is received by an NPU of the network device. The NPU of the network device may determine an SOF session associated with the packet based on tuples included in the first fragment, and may provide the fragments from the hash table toward a destination based on the SOF session. The network device may store an SOF session identifier in the hash table.

In this way, the network device offloads fragmented traffic without buffering. For example, since most traffic in a network is in order, an NPU of the network device may calculate an SOF session hash based on five tuples that are provided in a first packet fragment. The network device may process a packet as soon as the network device receives the first fragment (e.g., where a fragment offset is set to zero and a "more fragments" bit is set to one in a Layer 3 header) of the packet, rather than buffering all fragments of the packet in the NPU memory, which is limited. If fragments of a packet are out of order, the network device may store fragments until the first fragment (e.g., with SOF session details) is received. On receipt of the first fragment of the packet, the network device may perform an SOF session hash check and may offload the first fragment along with the previously stored fragments in order and without waiting for next fragments of the packet. The network device may update an SOF session identifier in a packet hash table so that incoming fragments with tuples matching the SOF session may be immediately offloaded. Thus, the network device conserves computing resources, networking resources, and/or the like that would otherwise have been consumed by drastically decreasing network device throughput, generating a lot of SPU cycles and utilizations, utilizing memory for storing fragments of a packet, underutilizing the NPU of the network device, creating additional delay in reassembly of the packet fragments, and/or the like.

FIGS. 1A-1H are diagrams of an example 100 associated with offloading fragmented traffic without buffering. As shown in FIGS. 1A-1H, example 100 includes an endpoint device and a server device associated with a network of network devices. Further details of the endpoint device, the server device, the network, and the network devices are provided elsewhere herein.

As shown in FIG. 1A, the network device may include an NPU and an SPU. The network device may utilize services offloading for processing fast-path packets in the NPU of the network device instead of in the SPU of the network device. As further shown in FIG. 1A, and by reference number 102, a network device may receive traffic destined for a destination. For example, the network device may receive, from the endpoint device, traffic destined for another endpoint device and/or the server device. In another example, the network device may receive, from the server device, traffic destined for the endpoint device. In some implementations, the network device may receive the traffic from another network device of the network.

As further shown in FIG. 1A, and by reference number 104, the network device may provide the traffic to the destination. For example, the network device may provide the traffic to another endpoint device, the server device and/or the like (e.g., the destination) via one or more other network devices. In some implementations, the network device may receive the traffic from the endpoint device and the traffic may include a destination address of the server device. In such implementations, the network device may forward the traffic directly to the server device or may forward the traffic to another network device. The other network device may forward the traffic directly to the server device or may forward the traffic to still another network device. The traffic may continue to be forwarded by the network devices until the traffic is received by the server device.

As shown in FIG. 1B, and by reference number 106, the network device may store fragments in a hash table, based on four tuple hashes of the fragments, until a first fragment is received by the NPU. For example, the traffic received by the network device may include packets and/or packet fragments (e.g., also referred to herein as "fragments"). The NPU of the network device may include a hash table. The NPU may store fragments (e.g., if coming out of order) in the hash table until a first fragment is received by the NPU. In some implementations, the NPU may utilize four tuple hashes (e.g., a source IP address, a destination IP address, an IP identification, and a verifiable random function (VRF)) of the fragments to store the fragments in the hash table until the first fragment is received by the NPU.

Figure 1C:
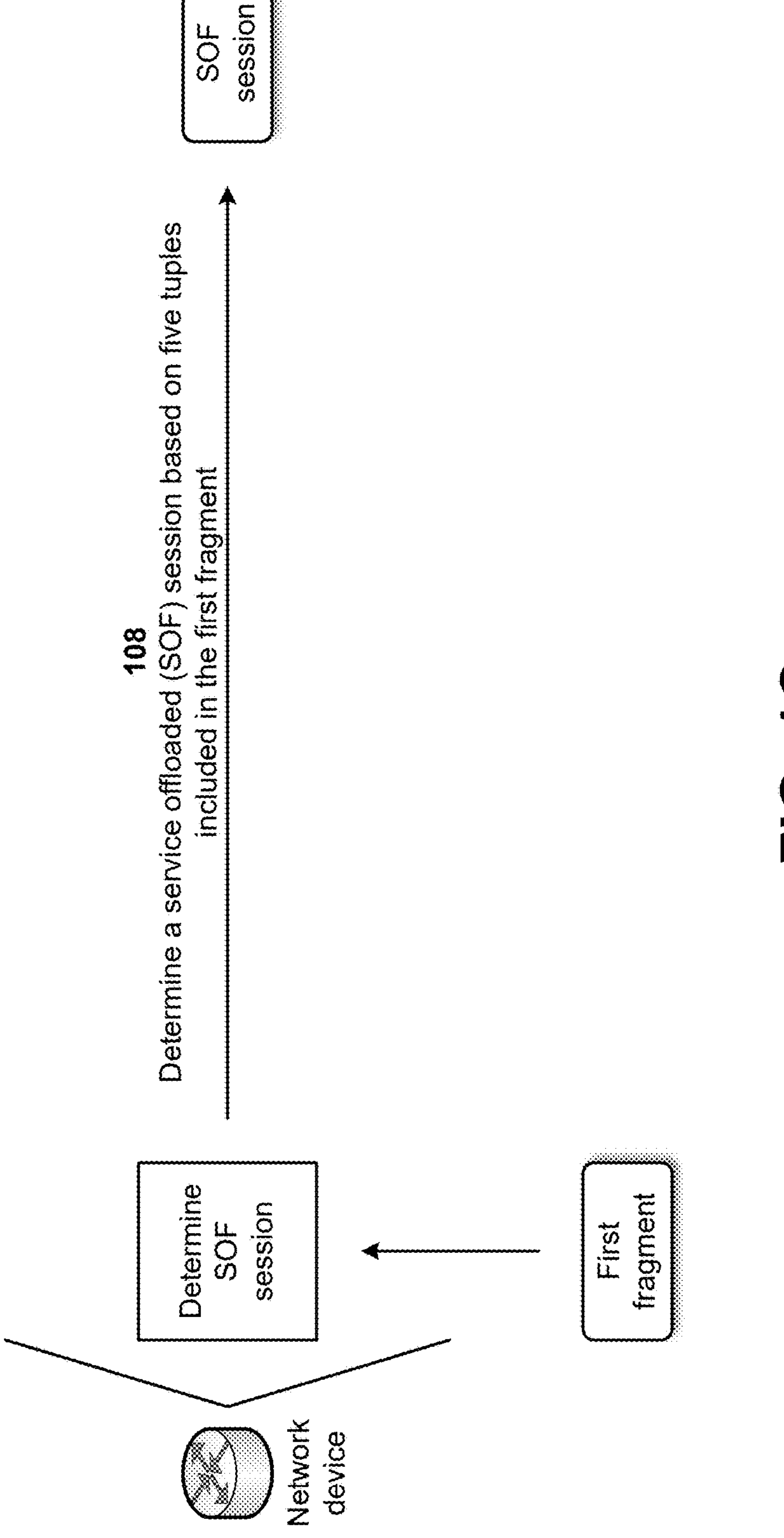

As shown in FIG. 1C, and by reference number 108, the network device may determine a service offloaded (SOF) session based on five tuples included in the first fragment. For example, when the first fragment is received, the NPU may determine the SOF session (e.g., associated with the fragments and the first fragment) based on five tuples of the first fragment. The five tuples may include a source IP address, a destination IP address, a protocol, a source port, and a destination port. The NPU may identify a fragment as a first fragment when a fragment offset is set to zero and a more fragment bit is set to one in a Layer 3 header.

Figure 1D:
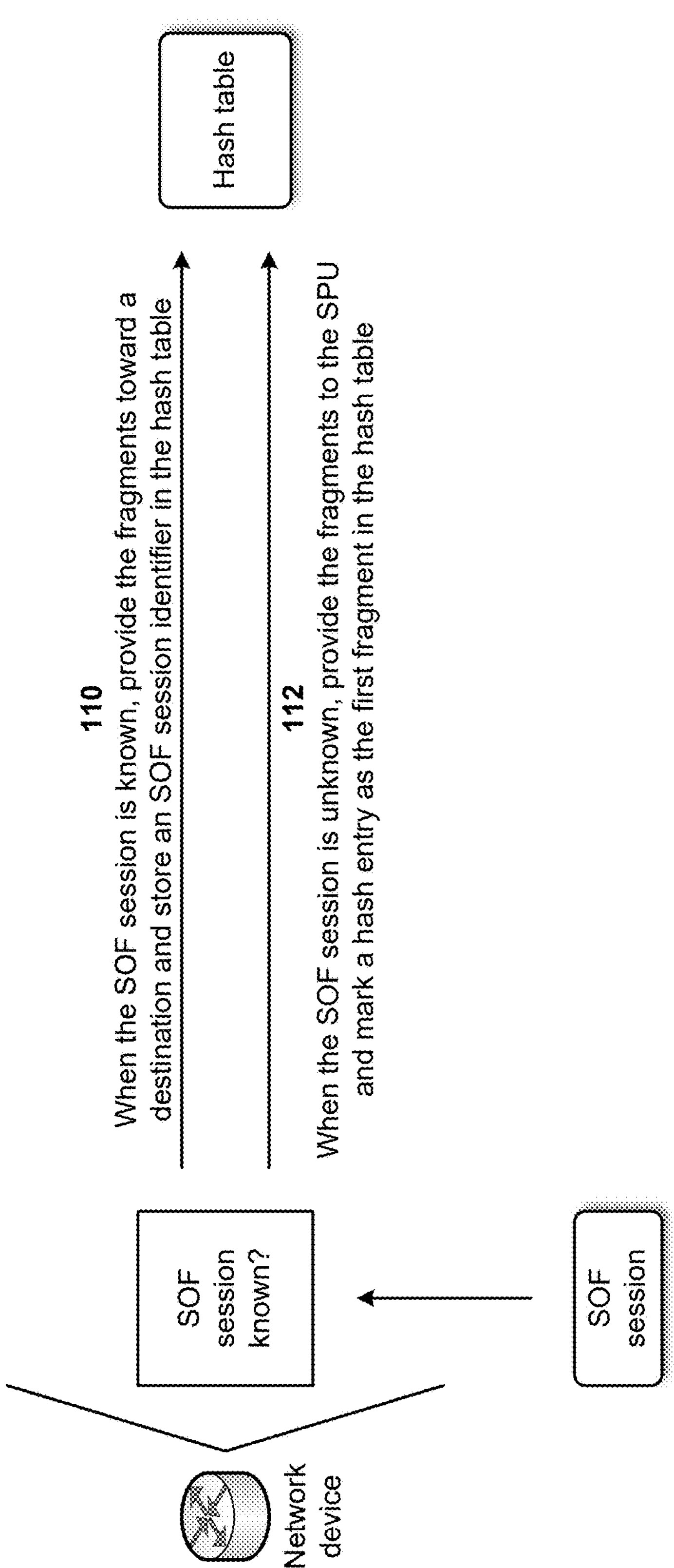

As shown in FIG. 1D, and by reference number 110, when the SOF session is known, the network device may provide the fragments toward a destination and may store an SOF session identifier in the hash table. For example, when the SOF is known, the NPU of the network device may provide the fragments toward the destination and may store an SOF session identifier in a hash table. In some implementations, the hash table may be the same hash table utilized by the NPU to store the fragments based on the four tuple hashes of the fragments.

As further shown in FIG. 1D, and by reference number 112, when the SOF session is unknown, the network device may provide the fragments to the SPU and mark a hash entry as the first fragment in the hash table. For example, when the SOF session is unknown, the NPU of the network device may provide the fragments to the SPU and mark, in the hash table, a hash entry identifying the first fragment of the SOF session. Additional fragments of the same packet may utilize the same SOF session identifier stored in the hash table when processing the additional fragments. For fragments associated with non-SOF sessions, the network device may provide such fragments from the NPU to the SPU. Once all fragments of the SOF session are received, the network device may delete a packet hash for all the fragments stored in the hash table.

Figure 1E:
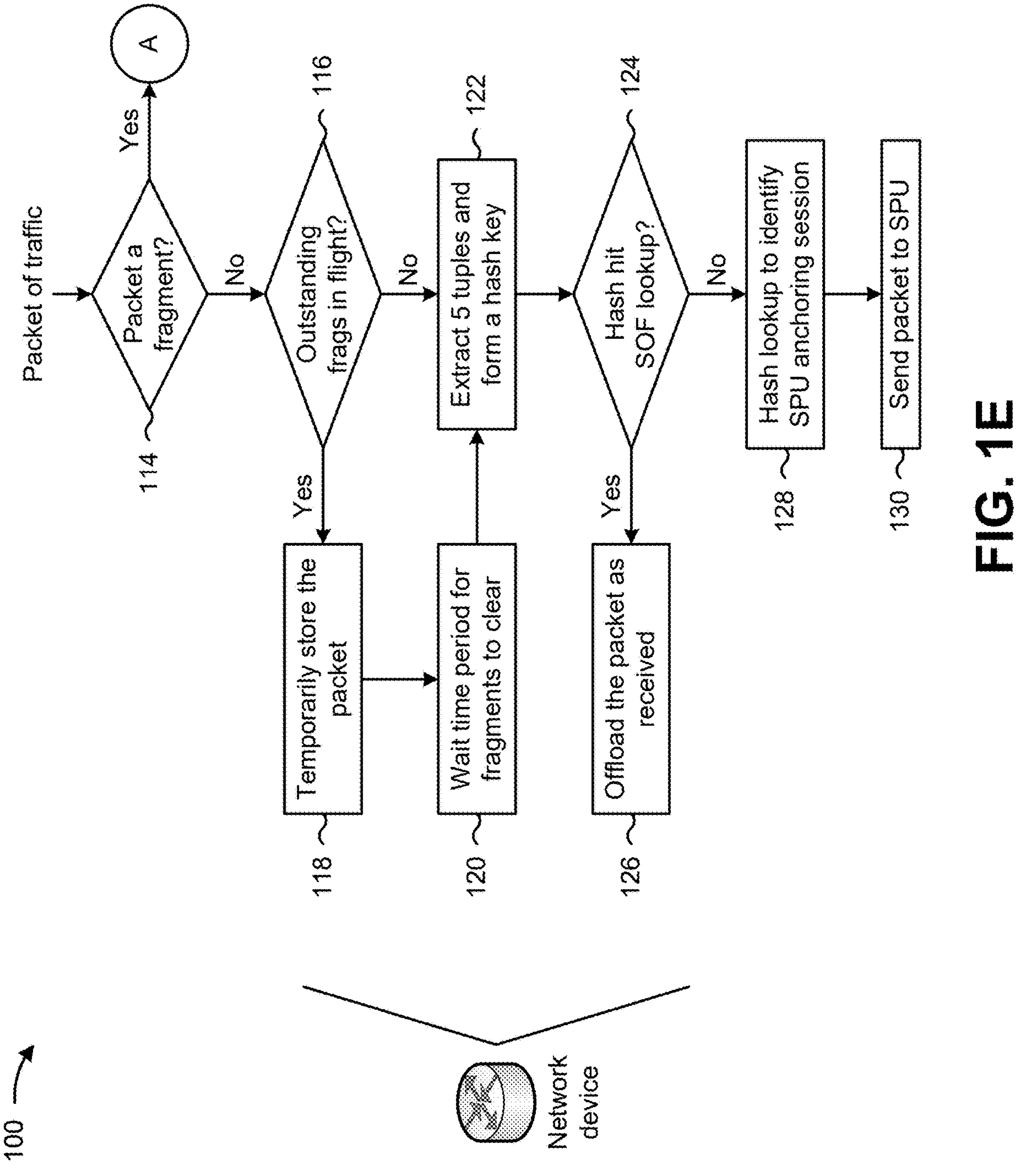
Figure 1F:
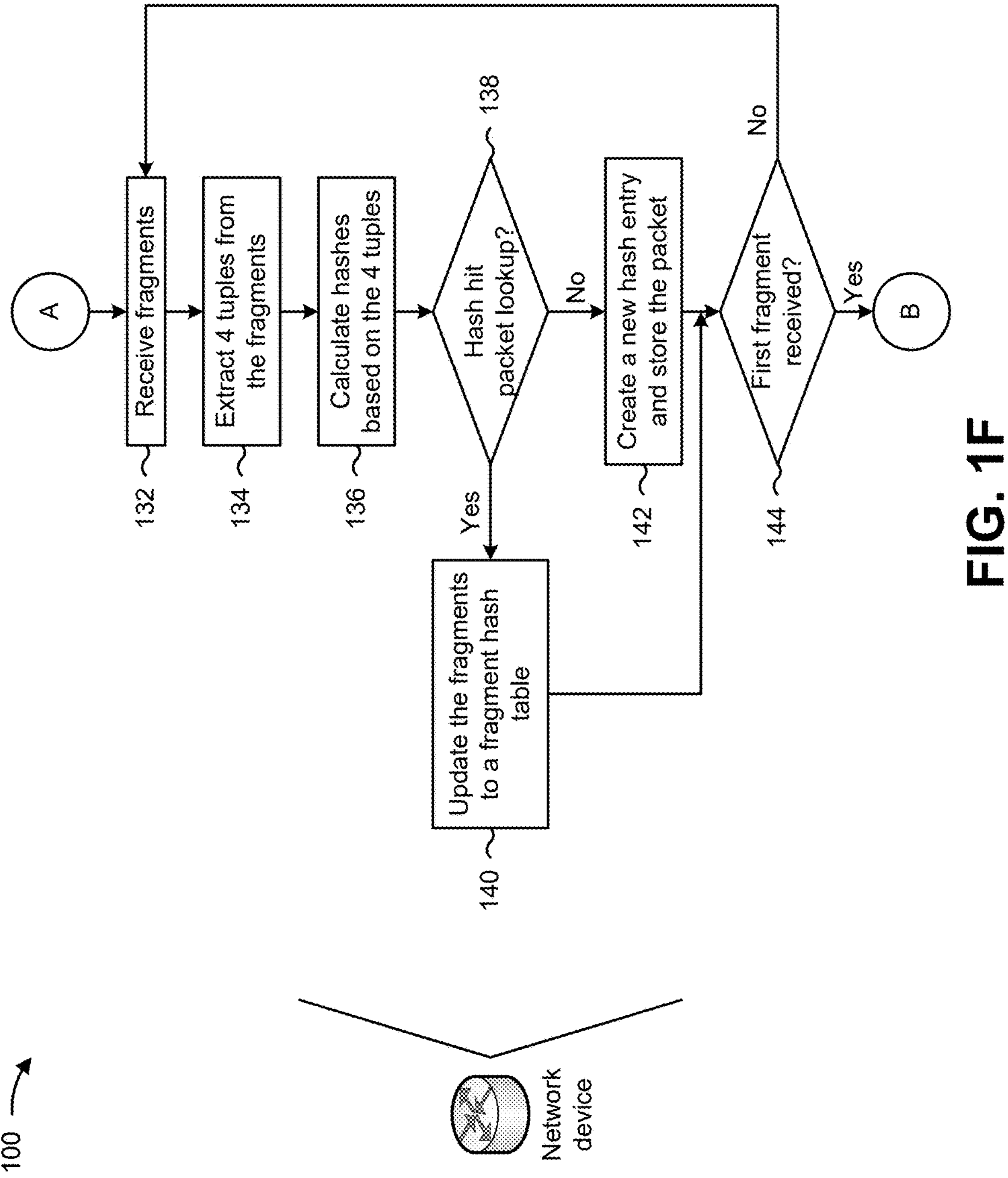
Figure 1G:
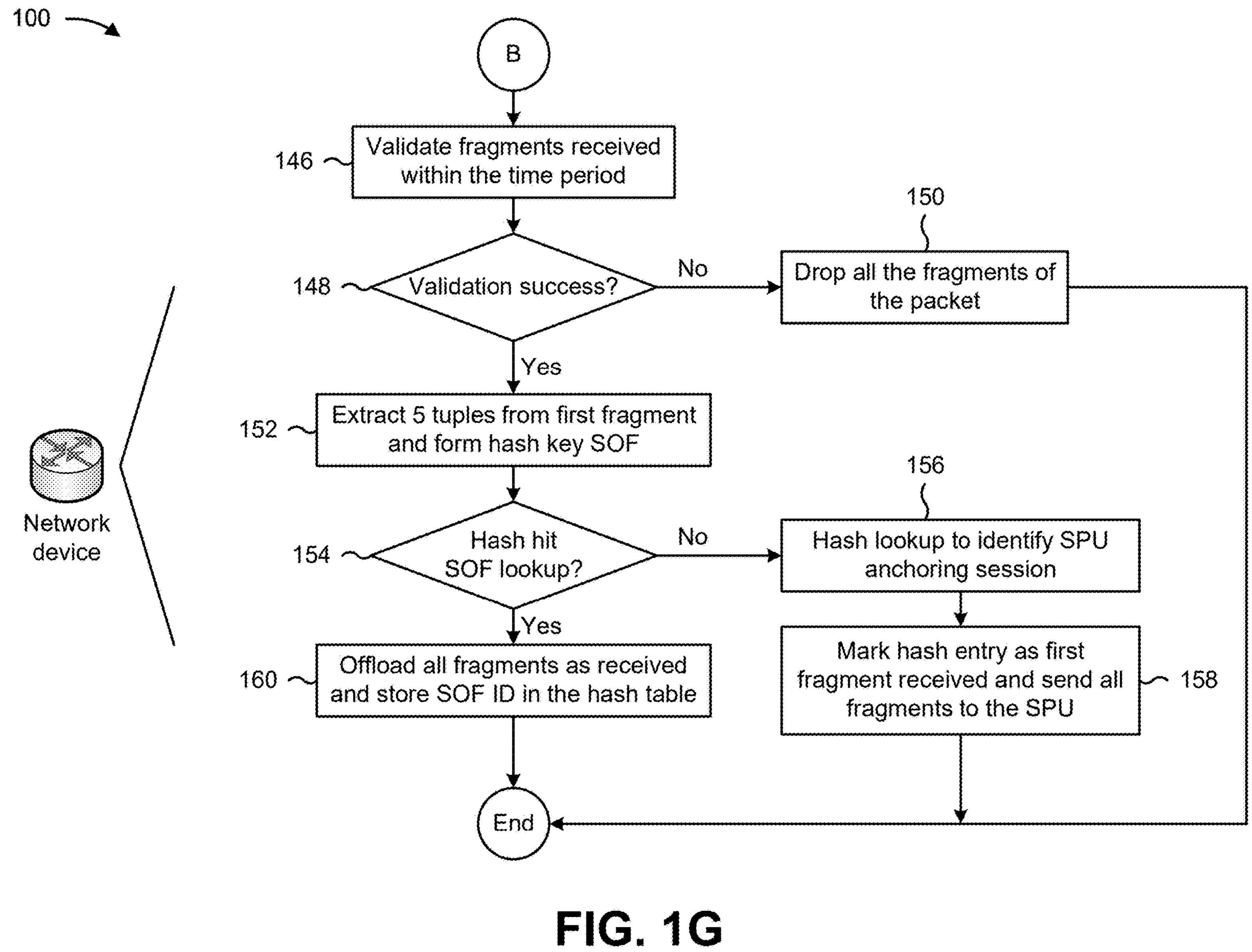

FIGS. 1E-1G depict a flow diagram associated with offloading fragmented traffic without buffering. As shown at step 114 of FIG. 1E, the network device may receive a packet of traffic and may determine whether the packet of traffic is a fragment. If the packet of traffic is a fragment (step 114—Yes), the network device may perform the functions described in connection with FIG. 1F (step A). If the packet of traffic is not a fragment (step 114—No), the network device may determine whether the packet is associated with any outstanding fragments in flight (step 116). If the packet is associated with any outstanding fragments (step 116—Yes), the network device may temporarily store the packet (step 118). As shown at step 120, the network device may wait a time period for the outstanding fragments in flight to clear. If the packet is not associated with any outstanding fragments (step 116—No) or the network device waits the time period for the outstanding fragments in flight to clear (step 120), the network device may extract five tuples from the packet and may form a hash key based on the five tuples (step 122).

As shown at step 124 of FIG. 1E, the network device may determine whether the hash key matches (e.g., provides a hit with) an SOF session. If the hash key matches an SOF session (step 124—Yes), the network device may offload the packet as received by the network device (step 126). If the hash key fails to match an SOF session (step 124—No), the network device may perform a hash lookup of the hash key to identify an SPU anchoring session (step 128). A shown at step 130, the network device may send the packet to the SPU associated with the SPU anchoring session.

As shown at step 132 of FIG. 1F, the network device may receive additional fragments associated with the packet. As shown at step 134, the network device may extract four tuples from the fragments. As shown at step 136, the network device may calculate hashes based on the four tuples extracted from the fragments. As shown at step 138, the network device may determine whether the hashes match (e.g., provide hits with) a packet stored in a fragment hash table. If the network device determines that the hashes match the packet stored in the fragment hash table (step 138—Yes), the network device may update the fragments to the fragment hash table (step 140). If the network device determines that the hashes fail to match the packet stored in the fragment hash table (step 138—No), the network device may create a new hash entry in the fragment hash table and may store the packet in the fragment hash table (step 142). As shown step 144, the network device may determine whether a first fragment is received. If the network device determines that the first fragment is not received (step 144—No), the network device may continue to receive additional fragments. If the network device determines that the first fragment is received (step 144—Yes), the network device may perform the functions described in connection with FIG. 1G (step B).

As shown at step 146 of FIG. 1G, the network device may validate the fragments received within a time period (e.g., in seconds, minutes, and/or the like). As shown at step 148, the network device may determine whether the validation of the fragments is successful. If the network device determines that the validation of the fragments is unsuccessful (step 148—No), the network device may drop all of the fragments of the packet and may end the process (step 150). If the network device determines that the validation of the fragments is successful (step 148—Yes), the network device may extract five tuples from the first fragment and may form a hash key SOF based on the extracted five tuples (step 152).

As shown at step 154 of FIG. 1G, the network device may determine whether the hash key SOF matches (e.g., provides a hit with) an SOF session. If the hash key SOF fails to match an SOF session (step 154—No), the network device may perform a hash lookup of the hash key to identify an SPU anchoring session (step 156). As shown at step 158, the network device may mark the hash entry as a first fragment received, may send all fragments to the SPU associated with the SPU anchoring session, and may end the process. If the hash key SOF matches an SOF session (step 154—Yes), the network device may offload all fragments as received by the network device, may store an SOF identifier in the hash table, and may end the process (step 160).

Figure 1H:
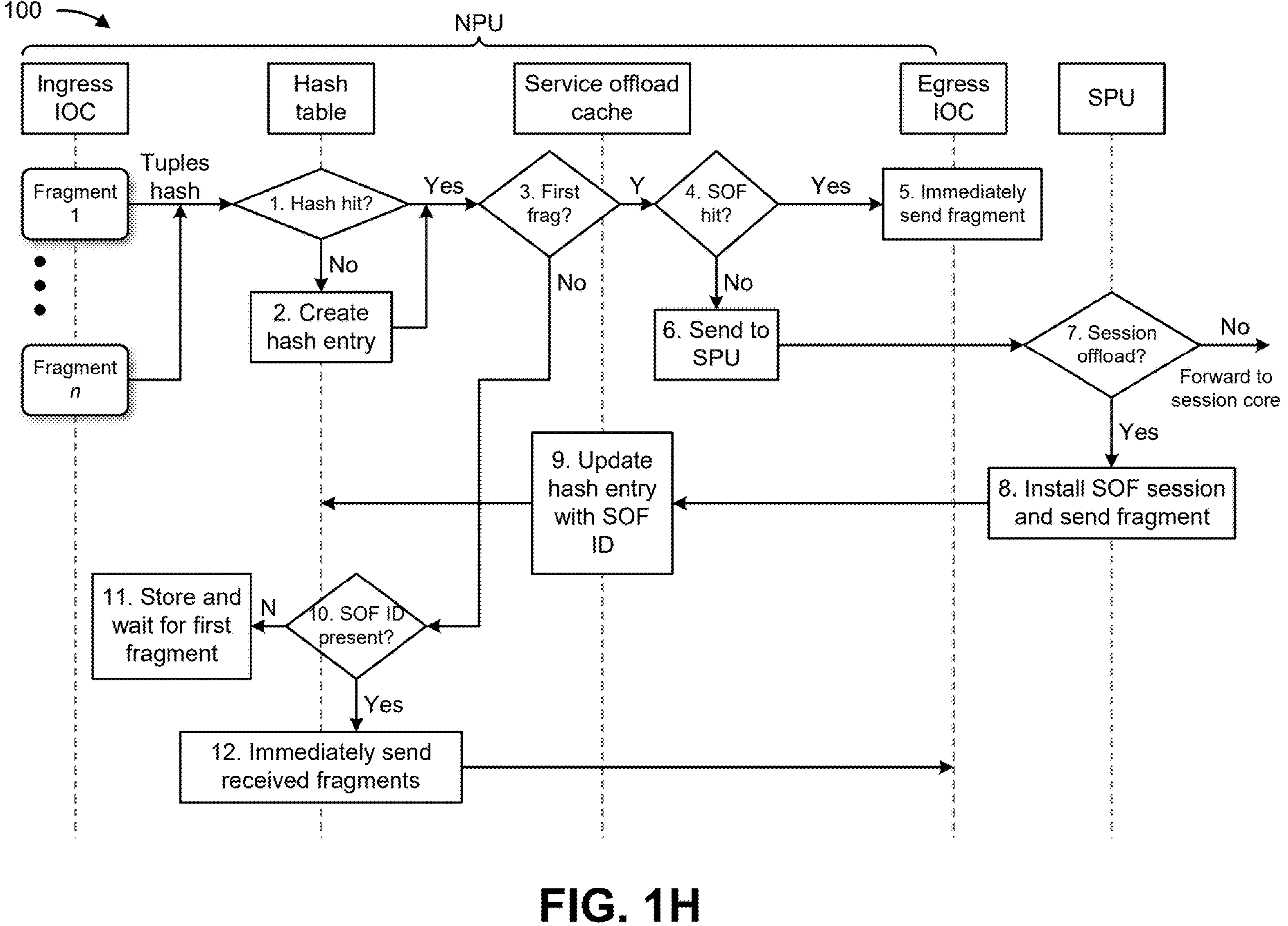

FIG. 1H depicts a flow diagram associated with offloading fragmented traffic without buffering. As shown, the network device may include an NPU and an SPU. The NPU of the network device may include an ingress input/output component (IOC), hash table, a service offload cache, and an egress IOC. As further shown, the ingress IOC may receive fragments (e.g., Fragment 1 through Fragment n), and the NPU may create hashes based on tuples of the fragments. As shown at step 1, the NPU may compare a hash of the fragment with entries in the hash table to determine whether there is a match (e.g., a hash hit). If the NPU determines that there is not a hash hit (step 1—No), the NPU may create a hash entry in the hash table for the fragment (step 2). If the NPU determines that there is a hash hit (Step 1—Yes), the NPU may determine whether the fragment is the first fragment (step 3). If the NPU determines that the fragment is the first fragment (step 3—Yes), the NPU may compare the hash of the fragment with entries in the service offload cache to determine whether there is a match (e.g., an SOF hit) (step 4). If the NPU determines that there is an SOF hit (step 4—Yes), the NPU may cause the egress IOC to immediately send the fragment (step 5).

If the NPU determines that there is not an SOF hit (step 4—No), the NPU may send the fragment to the SPU (step 6). As shown at step 7, the SPU may determine whether the fragment is associated with an SOF session offload. If the SPU determines that the fragment is not associated with an SOF session offload (step 7—No), the SPU may forward the fragment to a session core. If the SPU determines that the fragment is associated with an SOF session offload (step 7—Yes), the SPU may install the SOF session and send the fragment (step 8). As shown at step 9, the NPU may update the hash entry with an SOF session identifier (ID).

If the NPU determines that the fragment is not the first fragment (step 3—No), the NPU may determine whether an SOF ID is present in the fragment (step 10). If the NPU determines that an SOF ID is not present in the fragment (step 10—No), the NPU may store the fragment in the hash table and may wait for receipt of the first fragment (step 11). If the NPU determines that an SOF ID is present in the fragment (step 10—Yes), the NPU may immediately send the received fragments via the egress IOC of the NPU (step 12).

In this way, the network device offloads fragmented traffic without buffering. For example, since most traffic in a network is in order, an NPU of the network device may calculate an SOF session hash based on five tuples that provided in a first packet fragment. The network device may process a packet as soon as the network device receives the first fragment (e.g., where a fragment offset is set to zero and a more fragment bit is set to one in a Layer 3 header) of the packet, rather than buffering all fragments of the packet in the NPU memory, which is limited. If fragments of a packet are out of order, the network device may store fragments until the first fragment (e.g., with SOF session details) is received. On receipt of the first fragment of the packet, the network device may perform an SOF session hash check and may offload the first fragment along with the previously stored fragments in order and without waiting for next fragments of the packet. The network device may update an SOF session identifier in a packet hash table so that incoming fragments with tuples matching the SOF session may be immediately offloaded. Thus, the network device conserves computing resources, networking resources, and/or the like that would otherwise have been consumed by drastically decreasing network device throughput, generating a lot of SPU cycles and utilizations, utilizing memory for storing fragments of a packet, underutilizing the NPU of the network device, creating additional delay in reassembly of the packet fragments, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
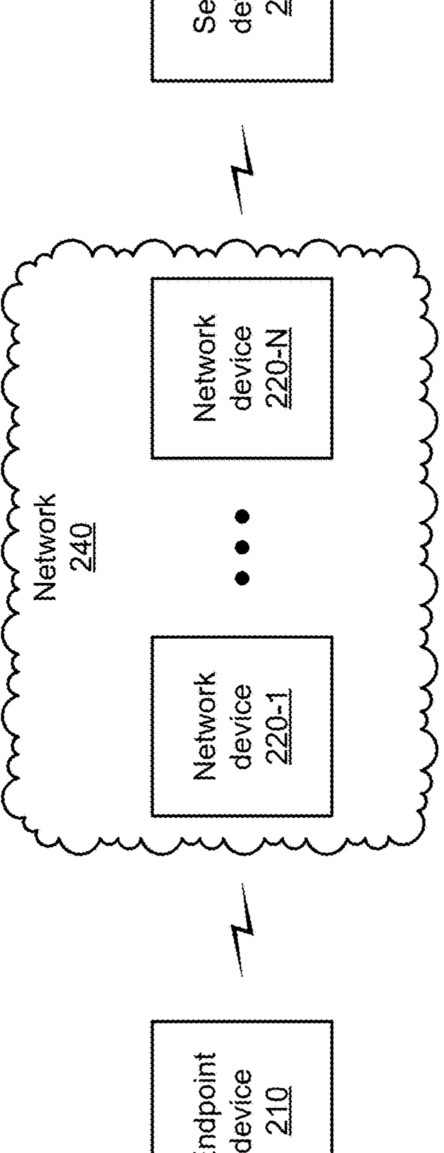
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, or a third generation (3G) network), a code division multiple access (CDMA) network, a public land mobile network (PLMN), a local area network (LAN), a WAN, a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
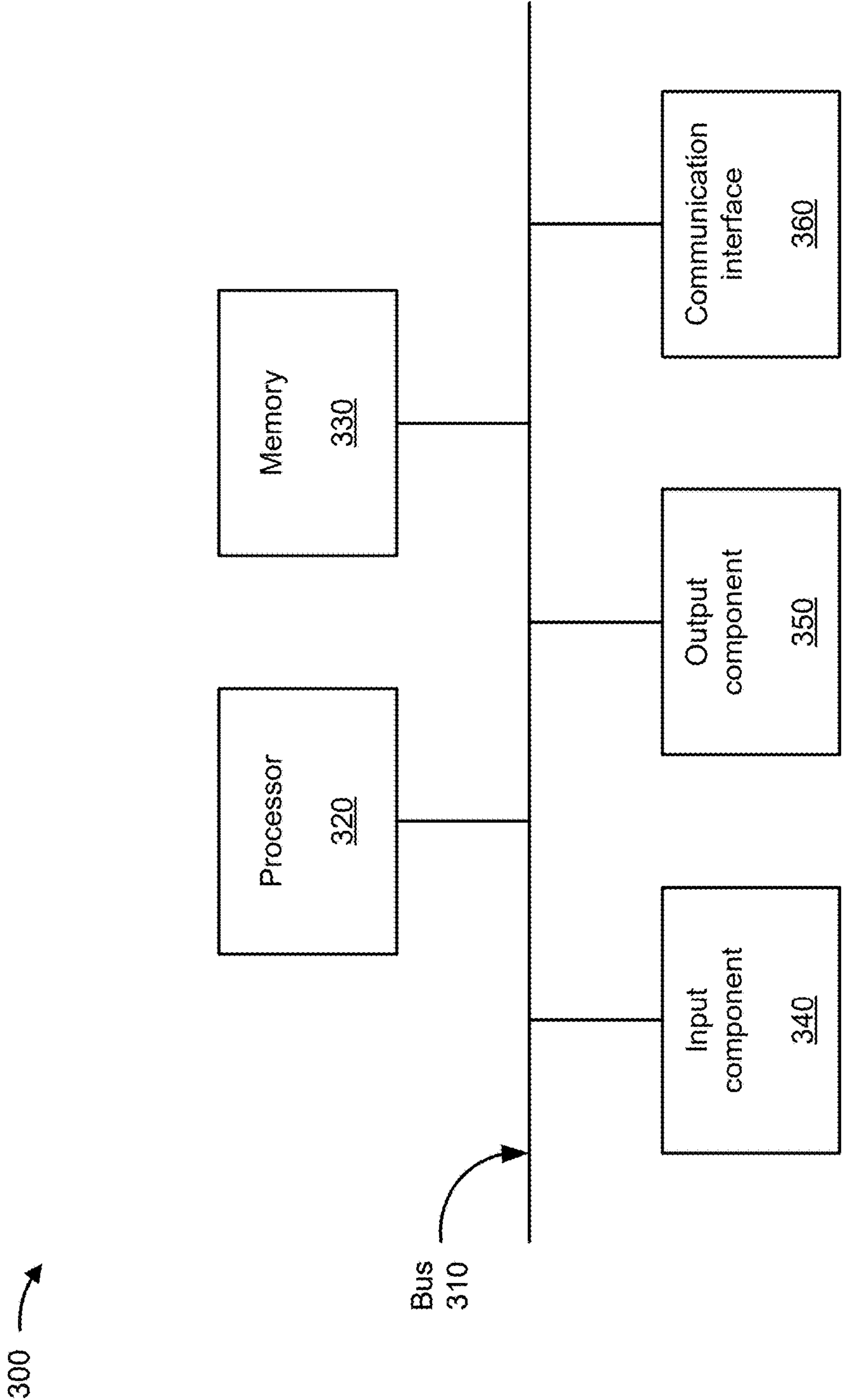
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
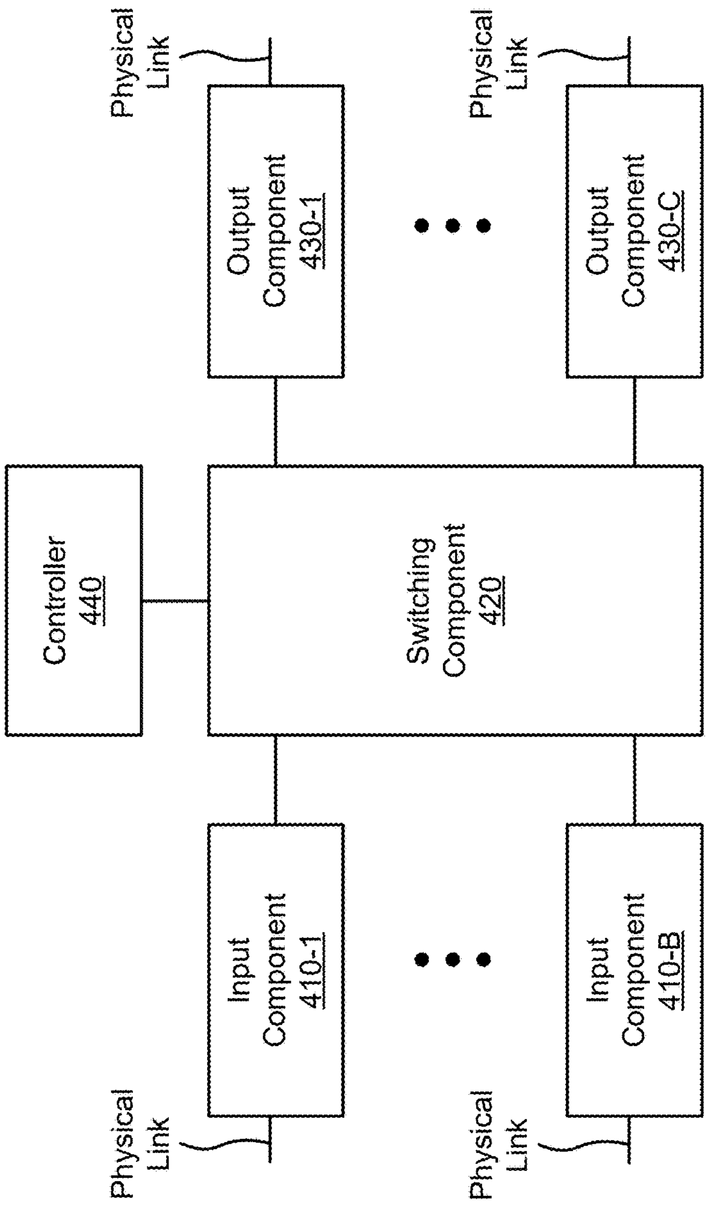

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
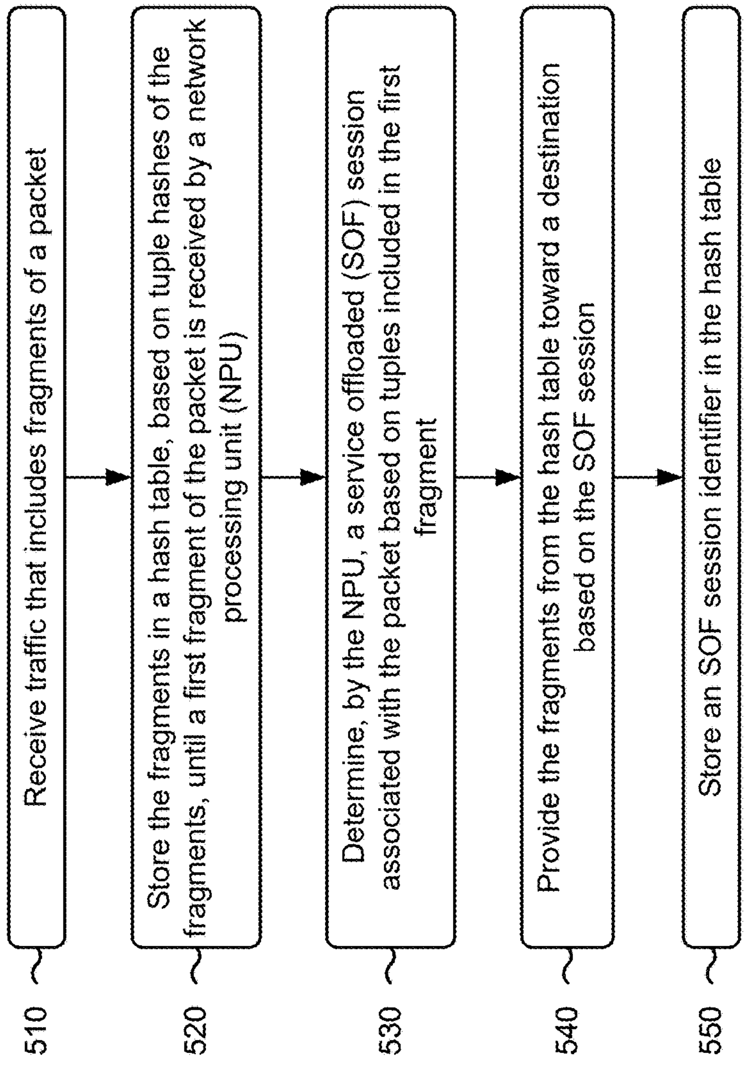
FIG. 5 is a flowchart of an example process for offloading fragmented traffic without buffering.

FIG. 5 is a flowchart of an example process 500 for offloading fragmented traffic without buffering. In some implementations, one or more process blocks of FIG. 5 may be performed by a network device (e.g., the network device 220). In some implementations, one or more process blocks of FIG. 5 may be performed by another device or a group of devices separate from or including the network device, such as a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving traffic that includes fragments of a packet (block 510). For example, the network device may receive traffic that includes fragments of a packet, as described above. In some implementations, the fragments of the packet are out of order.

As further shown in FIG. 5, process 500 may include storing the fragments in a hash table, based on tuple hashes of the fragments, until a first fragment of the packet is received by an NPU of the network device (block 520). For example, the network device may store the fragments in a hash table, based on tuple hashes of the fragments, until a first fragment of the packet is received by an NPU of the network device, as described above. In some implementations, a header of the first fragment includes a fragment offset set to a first value and a more fragment bit set to a second value. In some implementations, the network device includes one or more service processing units and the NPU of the network device includes an ingress input/output component (IOC), the hash table, a service offload cache, and an egress IOC. In some implementations, the first fragment includes five tuples associated with a source IP address, a destination IP address, a protocol, a source port, and a destination port.

As further shown in FIG. 5, process 500 may include determining an SOF session associated with the packet based on tuples included in the first fragment (block 530). For example, the network device may determine an SOF session associated with the packet based on tuples included in the first fragment, as described above.

As further shown in FIG. 5, process 500 may include providing the fragments from the hash table toward a destination based on the SOF session (block 540). For example, the network device may provide the fragments from the hash table toward a destination based on the SOF session, as described above. In some implementations, providing the fragments from the hash table toward the destination based on the SOF session includes providing the fragments from the hash table to a service processing unit (SPU) of the network device, and utilizing the SPU to provide the fragments toward the destination based on the SOF session. In some implementations, providing the fragments from the hash table toward the destination based on the SOF session includes providing the fragments from the hash table to an egress IOC of the NPU, providing the fragments from the egress IOC to an SPU of the network device, and utilizing the SPU to provide the fragments toward the destination based on the SOF session.

As further shown in FIG. 5, process 500 may include storing an SOF session identifier in the hash table (block 550). For example, the network device may store an SOF session identifier in the hash table, as described above.

In some implementations, process 500 includes receiving additional fragments associated with the SOF session, and utilizing the SOF session identifier stored in the hash table to provide the additional fragments toward the destination. In some implementations, process 500 includes receiving additional traffic that includes another packet, extracting tuples from the other packet based on determining that the other packet is not a fragment, and forming a hash key based on the tuples extracted from the other packet. In some implementations, process 500 includes determining that the hash key matches another SOF session, and offloading the other packet as received based on determining that the hash key packet matches the other SOF session. In some implementations, process 500 includes determining that the hash key fails to match another SOF session, performing a hash lookup, with the hash key, to identify an SPU of the network device based on determining that the hash key fails to match the other SOF session, and providing the other packet to the SPU.

In some implementations, process 500 includes extracting tuples from the fragments, and calculating the tuple hashes of the fragments based on the tuples extracted from the fragments. In some implementations, process 500 includes validating the fragments of the packet within a time period and prior to storing the fragments in a hash table.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a network device, traffic that includes fragments of a packet;

storing, by the network device, the fragments of the packet, based on a determination that a first fragment of the packet is not received by a network processing unit (NPU) of the network device, wherein the fragments of the packet are received out of order;

receiving, at the NPU of the network device, the first fragment of the packet;

determining, by the NPU of the network device, a service offloaded (SOF) session associated with the packet based on tuples included in the first fragment;

providing, by the network device, the fragments toward a destination based on the SOF session; and storing, by the network device, an SOF session identifier corresponding to the SOF session.

2. The method of claim 1, further comprising:

receiving additional fragments associated with the SOF session; and utilizing the stored SOF session identifier to provide the additional fragments toward the destination.

3. The method of claim 1, further comprising:

receiving additional traffic that includes another packet;

extracting tuples from the other packet based on determining that the other packet is not a fragment; and forming a hash key based on the tuples extracted from the other packet.

4. The method of claim 3, further comprising:

determining that the hash key matches another SOF session; and offloading the other packet as received based on determining that the hash key matches the other SOF session.

5. The method of claim 3, further comprising:

determining that the hash key fails to match another SOF session;

performing a hash lookup, with the hash key, to identify a service processing unit (SPU) of the network device based on determining that the hash key fails to match the other SOF session; and providing the other packet to the SPU.

6. The method of claim 1, further comprising:

extracting tuples from the fragments; and calculating tuple hashes of the fragments based on the tuples extracted from the fragments.

7. The method of claim 1, wherein storing the fragments of the packet further comprises:

storing the fragments in a hash table, based on tuple hashes of the fragments, until the first fragment of the packet is received by the NPU of the network device.

8. A network device, comprising:

one or more memories; and one or more processors to:

receive traffic that includes fragments of a packet;

store the fragments of the packet based on a determination that a first fragment of the packet is not received by a network processing unit (NPU) of the network device, wherein the fragments of the packet are received out of order;

receive, at the NPU of the network device, the first fragment of the packet;

determine a service offloaded (SOF) session associated with the packet based on tuples included in the first fragment;

provide the fragments toward a destination based on the SOF session; and store an SOF session identifier corresponding to the SOF session.

9. The network device of claim 8, wherein the one or more processors are further to:

validate the fragments of the packet within a time period and prior to storing the fragments.

10. The network device of claim 8, wherein the one or more processors, to provide the fragments toward the destination based on the SOF session, are to:

provide the fragments to a service processing unit (SPU) of the network device; and utilize the SPU to provide the fragments toward the destination based on the SOF session.

11. The network device of claim 8, wherein a header of the first fragment includes a fragment offset set to a first value and a more fragment bit set to a second value.

12. The network device of claim 8, wherein the one or more processors, to provide the fragments toward the destination based on the SOF session, are to:

provide the fragments to an egress input/output component (IOC) of the NPU;

provide the fragments from the egress IOC to a service processing unit (SPU) of the network device; and utilize the SPU to provide the fragments toward the destination based on the SOF session.

13. The network device of claim 8, wherein the network device includes one or more service processing units and the NPU of the network device includes an ingress input/output component (IOC), a hash table, a service offload cache, and an egress IOC.

14. The network device of claim 8, wherein the first fragment includes five tuples associated with a source Internet protocol (IP) address, a destination IP address, a protocol, a source port, and a destination port.

15. A non-transitory computer-readable medium storing a set of instructions, the set of instructions comprising:

one or more instructions that, when executed by one or more processors of a network device, cause the network device to:

receive traffic that includes fragments of a packet;

store the fragments of the packet based on a determination that a first fragment of the packet is not received by a network processing unit (NPU) of the network device, wherein the fragments of the packet are received out of order;

receive, at the NPU of the network device, the first fragment of the packet;

determine a service offloaded (SOF) session associated with the packet based on tuples included in the first fragment;

provide the fragments toward a destination based on the SOF session; and store an SOF session identifier corresponding to the SOF session.

16. The non-transitory computer-readable medium of claim 15, wherein the one or more instructions further cause the network device to:

receive additional fragments associated with the SOF session; and utilize the stored SOF session identifier to provide the additional fragments toward the destination.

17. The non-transitory computer-readable medium of claim 15, wherein the one or more instructions further cause the network device to:

receive additional traffic that includes another packet;

extract tuples from the other packet based on determining that the other packet is not a fragment; and form a hash key based on the tuples extracted from the other packet.

18. The non-transitory computer-readable medium of claim 17, wherein the one or more instructions further cause the network device to:

determine that the hash key matches another SOF session; and offload the other packet as received based on determining that the hash key matches the other SOF session.

19. The non-transitory computer-readable medium of claim 17, wherein the one or more instructions further cause the network device to:

determine that the hash key fails to match another SOF session;

perform a hash lookup, with the hash key, to identify a service processing unit (SPU) of the network device based on determining that the hash key fails to match the other SOF session; and provide the other packet to the SPU.

20. The non-transitory computer-readable medium of claim 15, wherein the one or more instructions further cause the network device to:

extract tuples from the fragments;

calculate tuple hashes of the fragments based on the tuples extracted from the fragments; and validate the fragments of the packet within a time period and prior to storing the fragments.

* * * * *